(12) United States Patent
Pietraszkiewicz et al.

(10) Patent No.: US 8,177,507 B2
(45) Date of Patent: May 15, 2012

(54) TRIANGULAR SERPENTINE COOLING CHANNELS

(75) Inventors: Edward F. Pietraszkiewicz, Southington, CT (US); Sandra S. Pinero, Middletown, CT (US)

(73) Assignee: United Technologies Corporation, Hartford, CT (US)

( * ) Notice: Subject to any disclaimer, the term of this patent is extended or adjusted under 35 U.S.C. 154(b) by 1036 days.

(21) Appl. No.: 12/152,370

(22) Filed: May 14, 2008

(65) Prior Publication Data

US 2009/0285683 A1  Nov. 19, 2009

(51) Int. Cl.
*F01D 5/08* (2006.01)
*F01D 5/18* (2006.01)

(52) U.S. Cl. ...... 416/97 R; 415/115; 415/116; 416/96 R

(58) Field of Classification Search .................. 415/115, 415/116; 416/96 R, 97 R
See application file for complete search history.

(56) References Cited

U.S. PATENT DOCUMENTS

| | | | |
|---|---|---|---|
| 5,156,526 A * | 10/1992 | Lee et al. ..................... | 416/97 R |
| 5,348,446 A * | 9/1994 | Lee et al. ..................... | 416/241 R |
| 5,387,085 A | 2/1995 | Thomas, Jr, et al. | |
| 5,403,159 A | 4/1995 | Green et al. | |
| 5,536,143 A | 7/1996 | Jacala et al. | |
| 5,591,007 A | 1/1997 | Lee et al. | |
| 5,660,524 A | 8/1997 | Lee et al. | |
| 5,669,759 A | 9/1997 | Beabout | |
| 5,700,131 A | 12/1997 | Hall et al. | |
| 5,931,638 A | 8/1999 | Krause et al. | |
| 5,967,752 A | 10/1999 | Lee et al. | |
| 6,019,579 A | 2/2000 | Fukuno et al. | |
| 6,036,440 A | 3/2000 | Tomita et al. | |
| 6,126,396 A | 10/2000 | Doughty et al. | |
| 6,139,269 A | 10/2000 | Liang | |
| 6,206,638 B1 * | 3/2001 | Glynn et al. ................ | 416/97 R |
| 6,471,479 B2 | 10/2002 | Starkweather | |
| 6,595,748 B2 | 7/2003 | Flodman et al. | |
| 6,672,836 B2 | 1/2004 | Merry | |
| 6,984,103 B2 * | 1/2006 | Lee et al. ..................... | 415/115 |
| 7,131,818 B2 | 11/2006 | Cunha et al. | |
| 7,186,082 B2 | 3/2007 | Mongillo, Jr. et al. | |
| 7,293,961 B2 * | 11/2007 | Lee et al. .................... | 416/96 R |
| 7,296,973 B2 | 11/2007 | Lee et al. | |
| 7,413,001 B2 * | 8/2008 | Wang et al. ................... | 164/516 |
| 7,413,407 B2 * | 8/2008 | Liang .......................... | 416/97 R |
| 2003/0133795 A1 * | 7/2003 | Manning et al. ............ | 416/97 R |
| 2006/0051208 A1 * | 3/2006 | Lee et al. ..................... | 416/97 R |
| 2006/0292005 A1 | 12/2006 | Pietraszkiewicz et al. | |
| 2007/0147997 A1 | 6/2007 | Cunha et al. | |
| 2007/0231138 A1 | 10/2007 | Levine et al. | |

* cited by examiner

Primary Examiner — Igor Kershteyn
(74) Attorney, Agent, or Firm — Kinney & Lange, P.A.

(57) ABSTRACT

A cooled airfoil includes a concave pressure wall extending radially from a base to a tip of the airfoil, a convex suction wall connected to the concave pressure wall at a leading edge and a trailing edge spaced axially from the leading edge, and cooling channels extending radially between the base and the tip of the airfoil between the concave pressure wall and the convex suction wall and configured to receive a cooling fluid supply through the base of the airfoil. The cooling channels include a leading edge channel, a trailing edge channel, a serpentine cooling circuit, and a dedicated up-pass channel. The serpentine cooling circuit includes a first up-pass channel forward of the trailing edge channel and configured to be in flow communication with a supply channel through the base of the airfoil, a down-pass channel forward of and in flow communication with the first up-pass channel, and a second up-pass channel forward of and in flow communication with the down-pass channel. At least the down-pass channel and the second up-pass channel of the serpentine circuit have a generally triangular transverse cross-sectional shape. The dedicated up-pass channel is arranged between the leading edge channel and the second up-pass channel of the serpentine cooling circuit.

23 Claims, 6 Drawing Sheets

TRIANGULAR SERPENTINE COOLING CHANNELS

CROSS-REFERENCE TO RELATED APPLICATION(S)

The present application is related to the following copending application filed on the same day as this application: "TURBINE BLADE INTERNAL COOLING CONFIGURATION" by Sandra S. Pinero et al. (U.S. application Ser. No. 12/152,372). This application is incorporated herein by this reference.

BACKGROUND

The present invention relates to gas turbine engine blades. In particular, the present invention relates to the internal cooling configuration of turbine blades.

A gas turbine engine commonly includes a fan, a compressor, a combustor, a turbine, and an exhaust nozzle. During engine operation, working medium gases, for example air, are drawn into and compressed in the compressor. The compressed air is channeled to the combustor where fuel is added to the air and the air/fuel mixture is ignited. The products of combustion are discharged to the turbine section, which extracts a portion of the energy from these products to power the fan and compressor. The fan and compressor together with the energy in the combustion products not used by the turbine to drive the fan and compressor produce useful thrust to power, for example, an aircraft in flight.

The compressor and turbine commonly include alternating stages of rotor blades and stator vanes. Compressor and turbine blades and vanes often include complex, contoured blade geometries designed to optimally interact with the working medium gas passing through the engine. Additionally, the operating temperatures of some engine stages, such as in the high pressure turbine stages, may exceed the material limits of the blades and therefore necessitate cooling the blades. Cooled blades may include cooling channels, sometimes referred to as passages, in various configurations through which a coolant, such as compressor bleed air, is directed to convectively cool the blade. Blade cooling channels may be oriented spanwise from the root to the tip of the blade or axially between leading and trailing edges. The channels may be fed by one or more supply channels located toward the root, where the coolant flows radially outward from the root to tip, in what is sometimes referred to as an "up-pass." Alternatively, the channels may be fed by one or more supply channels located toward the tip of the blade, in a so-called "down-pass." In addition to individual up and down passes, some blades include cooling channels in a serpentine configuration consisting of several adjacent up and down-passes proceeding axially forward or afterward through the blade. The blades may also include other cooling features, such as film cooling holes for exhausting the coolant from the cooling channels over the exterior surface of the blade, as well as impingement cooling walls, trip strips, and turbulators.

Prior turbine blade designs have continually sought to decrease blade temperatures through cooling. A particular challenge in prior cooled blades lies in cooling the concave pressure side of turbine blades where temperatures are generally higher than, for example, the convex suction side of the blade. Prior cooled blades and vanes have employed several techniques to cool the pressure side including internal cooling channels supplied with bleed air from the compressor and adapted to eject the cooling fluid through film cooling holes onto the exterior of the pressure side wall. However, due to the relatively high temperatures encountered during operation, a need still exists to improve the preferential cooling of turbine blade and vane airfoil pressure side walls.

SUMMARY

A cooled airfoil includes a concave pressure wall extending radially from a base to a tip of the airfoil, a convex suction wall connected to the concave pressure wall at a leading edge and a trailing edge spaced axially from the leading edge, and cooling channels extending radially between the base and the tip of the airfoil between the concave pressure wall and the convex suction wall and configured to receive a cooling fluid supply through the base of the airfoil. The cooling channels include a leading edge channel, a trailing edge channel, a serpentine cooling circuit, and a dedicated up-pass channel. The serpentine cooling circuit includes a first up-pass channel forward of the trailing edge channel and configured to be in flow communication with a supply channel through the base of the airfoil, a down-pass channel forward of and in flow communication with the first up-pass channel, and a second up-pass channel forward of and in flow communication with the down-pass channel. At least the down-pass channel and the second up-pass channel of the serpentine circuit have a generally triangular transverse cross-sectional shape. The dedicated up-pass channel is arranged between the leading edge channel and the second up-pass channel of the serpentine cooling circuit.

DETAILED DESCRIPTION

Figure 1:
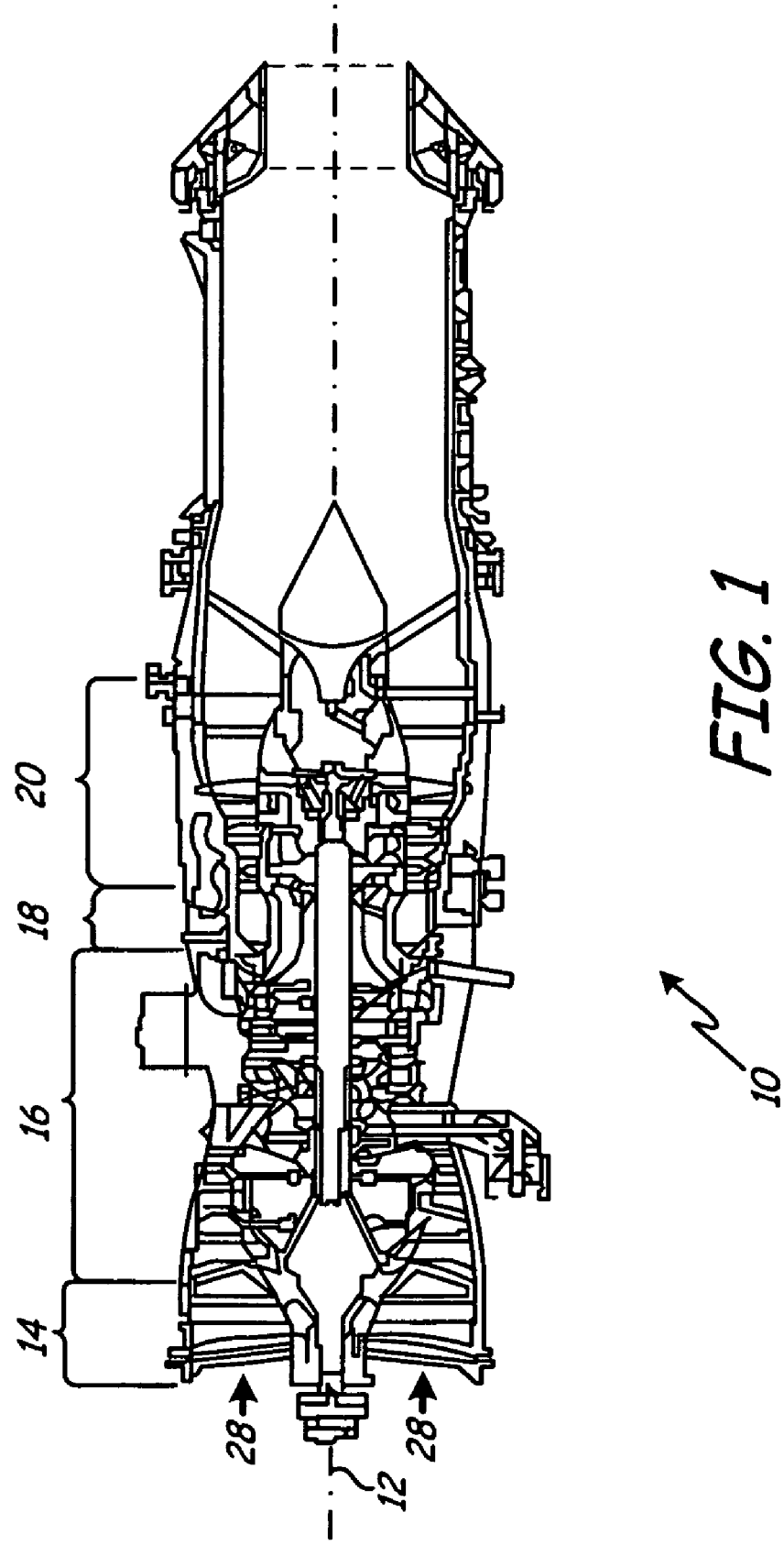
FIG. 1 is an axial cross-section of a gas turbine engine including cooled blades according to the present invention.

FIG. 1 is an axial cross-section of gas turbine engine 10 including engine axis 12, fan 14, compressor 16, combustor 18, and turbine 20. Fan 14 includes a casing surrounding a rotor to which fan blades are attached. Gas stream 28, for example a stream of air, is pulled into the front of engine 10 by fan 14, by the rotation of the fan blades about axis 12. Fan 14 directs gas stream 28 into compressor 16. Gas stream 28 is successively compressed through stages of compressor 16 and directed into combustor 18. Gas stream 28 is mixed with fuel and ignited in combustor section 18. The gas and fuel mixture ignited in combustor section 18 is directed into turbine 20 in which the mixture is successively expanded through alternating stages of turbine rotor blades and stator vanes. A portion of the gas and fuel mixture leaving combustor 18 acts to rotate turbine 20, which powers fan 14 and compressor 16. The remaining portion of the gas and fuel mixture passing through turbine 20 exits the back of engine 10 to provide thrust for engine 10. Due to the high operating temperature of some stages of engine 10, such as the high pressure turbine stages immediately aft of combustor 18, the blades and vanes may be cooled using, for example, air bled from compressor 16.

Figure 2:
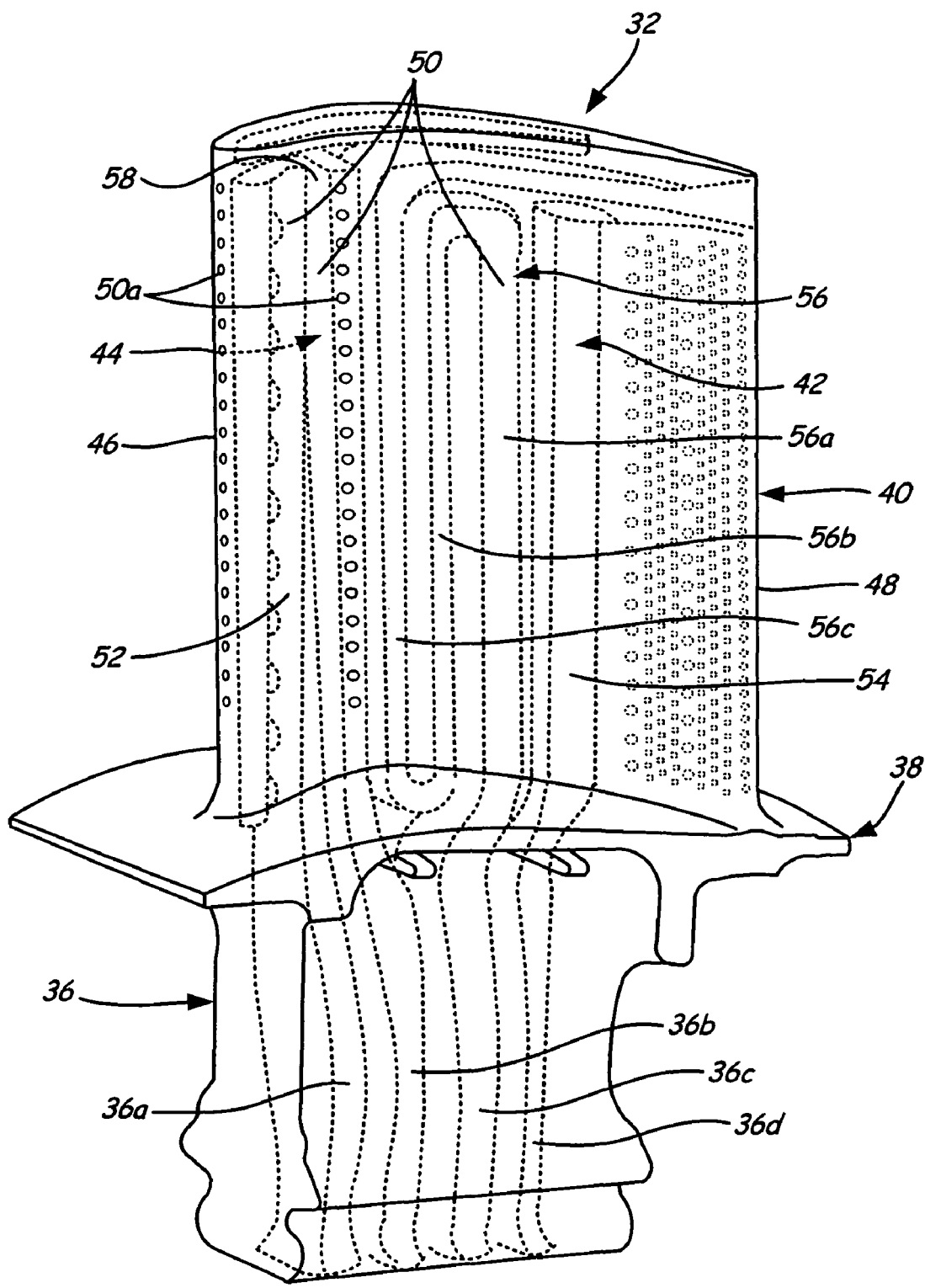
FIG. 2 is a perspective view of a cooled blade employed in the gas turbine engine of FIG. 1.

FIG. 2 is a perspective view of cooled blade 32, hereinafter referred to as blade 32, according to the present invention, which includes root 36, platform 38, and airfoil 40. Blade 32 may be, for example, a high pressure turbine blade. Root 36 of blade 32 may include a dovetail or fir tree geometry configured to be received in a slot in the rim of a rotor disc. Root 36 includes four cooling fluid supply channels 36a, 36b, 36c, and 36d. Platform 38 is integral with and radially outward of root 36. Supply channels 36a, 36b, 36c, and 36d extend through platform 38 into airfoil 40. Airfoil 40 of blade 32 extends radially from platform 38 to the tip of blade 32. Airfoil 40 includes concave pressure wall 42, convex suction wall 44, and cooling channels 50. Concave pressure wall 42 extends radially from the base to the tip of airfoil 40. Convex suction wall 44 is connected to concave pressure wall 42 at leading edge 46 and trailing edge 48 spaced axially from leading edge 46. Concave pressure wall 42 and convex suction wall 44 may include film cooling apertures, such as film cooling holes 50a, adapted to exhaust cooling fluid from cooling channels 50 onto the exterior surface of airfoil 40.

Cooling channels 50 are formed between concave pressure wall 42 and convex suction wall 44 and configured to receive cooling fluid from supply channels 36a, 36b, 36c, and 36d. Cooling channels 50 include leading edge channel 52, trailing edge channel 54, serpentine cooling circuit 56, and dedicated up-pass channel 58. Leading edge channel 52 extends radially from the base toward the tip of airfoil 40 and is in flow communication with supply channel 36a. Trailing edge channel 54 extends radially from the base toward the tip and is in flow communication with supply channel 36d and trailing edge apertures, such as holes and/or slots, adapted to exhaust cooling fluid to the exterior of airfoil 40. Serpentine circuit 56 includes first up-pass channel 56a, down-pass channel 56b, and second up-pass channel 56c. First up-pass channel 56a is forward of and adjacent to trailing edge channel 54 and extends radially from the base toward the tip of airfoil 40. First up-pass channel 56a is in flow communication with supply channel 36c. Down-pass channel 56b is in flow communication with first up-pass channel 56a and extends radially adjacent the tip toward the base of airfoil 40. Second up-pass channel 56c is in flow communication with down-pass channel 56b and extends radially from the base toward the tip of airfoil 40. Dedicated up-pass channel 58 extends radially from the base toward the tip of airfoil 40 between leading edge channel 52 and third channel 56c of serpentine circuit 56 and is in flow communication with supply channel 36b.

During engine operation, blade 32 may be cooled using, for example, air bled from compressor 16 shown in FIG. 1. Compressor bleed air is fed to supply channels 36a, 36b, 36c, and 36d in root 36 of blade 32. Air flows radially outward through supply channel 36a into leading edge channel 52 inside airfoil 40. Air also flows radially outward through supply channel 36d into trailing edge channel 54 and may be exhausted to the exterior of airfoil 40 through trailing edge exhaust apertures, such as holes and/or slots. Air flows radially outward through supply channel 36c into first up-pass channel 56a of serpentine circuit 56. The air flow in serpentine circuit 56 continues from first up-pass channel 56a into down-pass channel 56b and second up-pass channel 56c. Finally, the remaining portion of compressor bleed air flows radially outward through supply channel 36b into dedicated up-pass channel 58. Blade 32 is convectively cooled, as the relatively cool air fed from the compressor flows through cooling channels 50 in airfoil 40. Additionally, blade 32 may include film cooling holes 50a in concave pressure wall 42 and convex suction wall 44 adapted to exhaust cooling fluid from one or more of cooling channels 50 to the exterior surfaces of airfoil 40, thereby creating a thin layer of cooling fluid that insulates airfoil 40 from the hot working medium gas flowing over blade 32.

Figure 3:
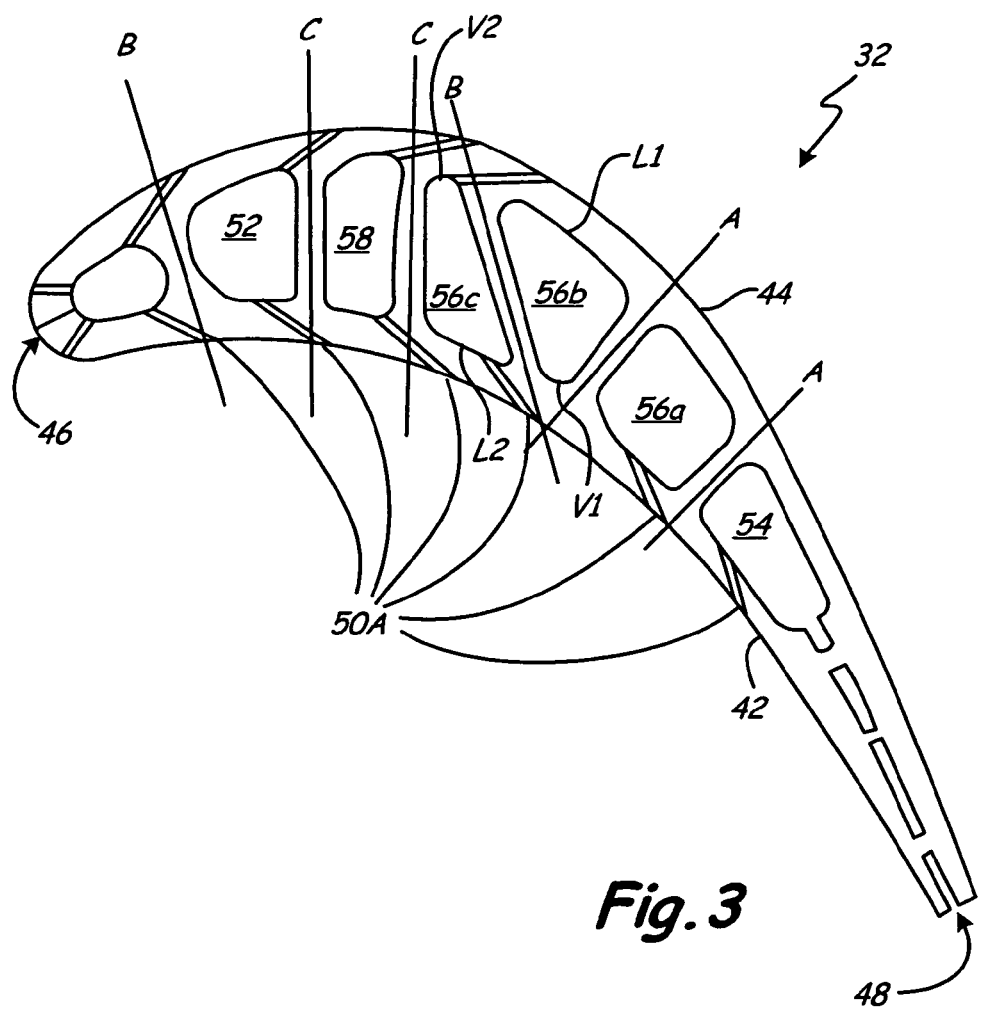
FIG. 3 is a mid-span transverse sectional view of the blade of the turbine blade shown in FIG. 2.

FIG. 3 is a mid-span sectional view of airfoil 40 of blade 32 showing the transverse cross-sectional shape of cooling channels 50. In FIG. 3, down-pass channel 56b and second up-pass channel 56c of serpentine cooling circuit 56 have a generally triangular shape. Generally triangular down-pass channel 56b is arranged such that vertex V1 is adjacent concave pressure wall 42 and leg L1 extends along a portion of convex suction wall 44. Forward of down-pass channel 56b, generally triangular second up-pass channel 56c is arranged such that leg L2 extends along a portion of concave pressure wall 42 and vertex V2 is adjacent convex suction wall 44. Cooling channels 50 of blade 32 include five up-pass channels including trailing edge channel 54, first up-pass channel 56a, second up-pass channel 56c, dedicated up-pass channel 58, and leading edge channel 52. The up-pass channels of cooling channels 50 each include angled film cooling holes 50a adapted to exhaust cooling fluid from cooling channels 50 onto the exterior surface of airfoil 40 along concave pressure wall 42. Additionally, trailing edge channel 54, first up-pass channel 56a, dedicated up-pass channel 58, and leading edge channel 52 are each independently supplied cooling fluid through supply channels 36d, 36c, 36b, 36a respectively. Blade 32 includes only one down-pass channel; down-pass channel 56b of serpentine cooling circuit 56.

Many factors affect the cooling of gas turbine engine blades and vanes, such as blade 32, during engine operation. A constant challenge in turbine blade design is reducing the temperature of the blade as much as possible through the use of coolant and in particular reducing the temperature of the blade in critical areas such as along concave pressure wall 42. Cooled blades and vanes according to the present invention, such as blade 32 shown in FIG. 2, generally decrease temperatures along concave pressure wall 42 by increasing the number of up-pass cooling channels and decreasing the distance between up-pass channels along concave pressure wall 42.

Increasing the number of up-pass channels increases the cooling effect on concave pressure wall 42 caused by rotation of the blade. During engine operation, turbine blades, such as blade 32, rotate about the main axis of the engine. Each of the blades in a blade array is positioned at a particular angle with respect to the axial flow of hot working medium gas through the engine. In many applications, the suction side of the blade is the leading side as each blade rotates about the engine axis through the flow of hot working medium gas. As a result of this orientation, Coriolis forces drive the cooling fluid flowing through the cooling channels of the blade against the rotating internal trailing pressure side of the blade airfoil as the blade rotates. Impingement of the cooling fluid on the pressure side of the blade airfoil induced by rotation has the effect of augmenting heat transfer between the cooling fluid and the blade, thereby increasing cooling on the pressure side wall. However, the augmentation of heat transfer due to blade rotation occurs primarily in cooling channels in which the cooling fluid is flowing in a radially outward direction, i.e. in up-pass cooling channels. Therefore, increasing the number of up-pass cooling channels increases the cooling of the pressure side of the blade. Embodiments of the present invention, such as blade 32, increase the number of up-pass cooling channels by supplying cooling fluid through supply channels 36d, 36c, 36b, 36a in root 36 independently to each of trailing edge channel 54, first up-pass channel 56a, dedicated up-pass channel 58, and leading edge channel 52 respectively.

Decreasing the distance between up-pass channels and increasing the number of up-pass channels increases the potential density of film cooling holes communicating cooling fluid from the channels to the exterior of concave pressure wall 42, which in turn increases the cooling of pressure wall 42. It is generally more advantageous to arrange film cooling holes in flow communication with up-pass, as opposed to down-pass, cooling channels. Angled cooling holes, such as film cooling holes 50a shown in FIG. 3, produce a natural ram effect on the cooling fluid flowing through up-pass channels when the blade is rotating. The rotation of the blade and the orientation of the film cooling holes forces the cooling fluid into the angled cooling hole, which in turn increases the fluid pressure at the holes above the static pressure of the fluid in the cooling channel. Creating a localized pressure increase is advantageous to increase film cooling effectiveness when the higher pressure fluid is exhausted through the cooling holes onto the exterior of the blade airfoil. The pressure increase also guards against hot working medium gas on the exterior of the blade being ingested into the cooling channels. Therefore, decreasing the distance between up-pass channels (and increasing the number of up-pass channels) increases the cooling of the pressure wall by increasing the density of film cooling holes communicating cooling fluid from the up-pass channels to the pressure wall. Cooled blades and vanes according to the present invention employ generally triangular shaped cooling channels, such as down-pass channel 56b and second up-pass channel 56c, in serpentine cooling circuit 56 to decrease the distance between up-pass channels along concave pressure wall 42.

The transverse cross-sectional shape of cooling channels in gas turbine blades and vanes is often selected to simplify manufacturing. In particular, the shape of the cooling channels and the orientation of the channels with respect to each other may be selected to minimize the number of die pulls necessary to produce a lost wax ceramic core used to investment cast the blade. Embodiments of the present invention, although including generally triangular instead of rectangular serpentine channels, do not unnecessarily complicate manufacturing of the blade or vane including the channels. As shown in FIG. 3, channels 52, 54, 56a, 56b, 56c, and 58 may be oriented such that forming a core of blade 32 only requires three die pulls along paths A, B, and C. Blades and vanes according to the present invention may be manufactured by employing, for example, the methods and devices described in U.S. Patent App. No. 2006/0292005 entitled "METHOD OF FORMING TURBINE BLADE WITH ANGLED INTERNAL RIBS" by Pietraszkiewicz et al., which is incorporated herein by reference.

Figure 4:
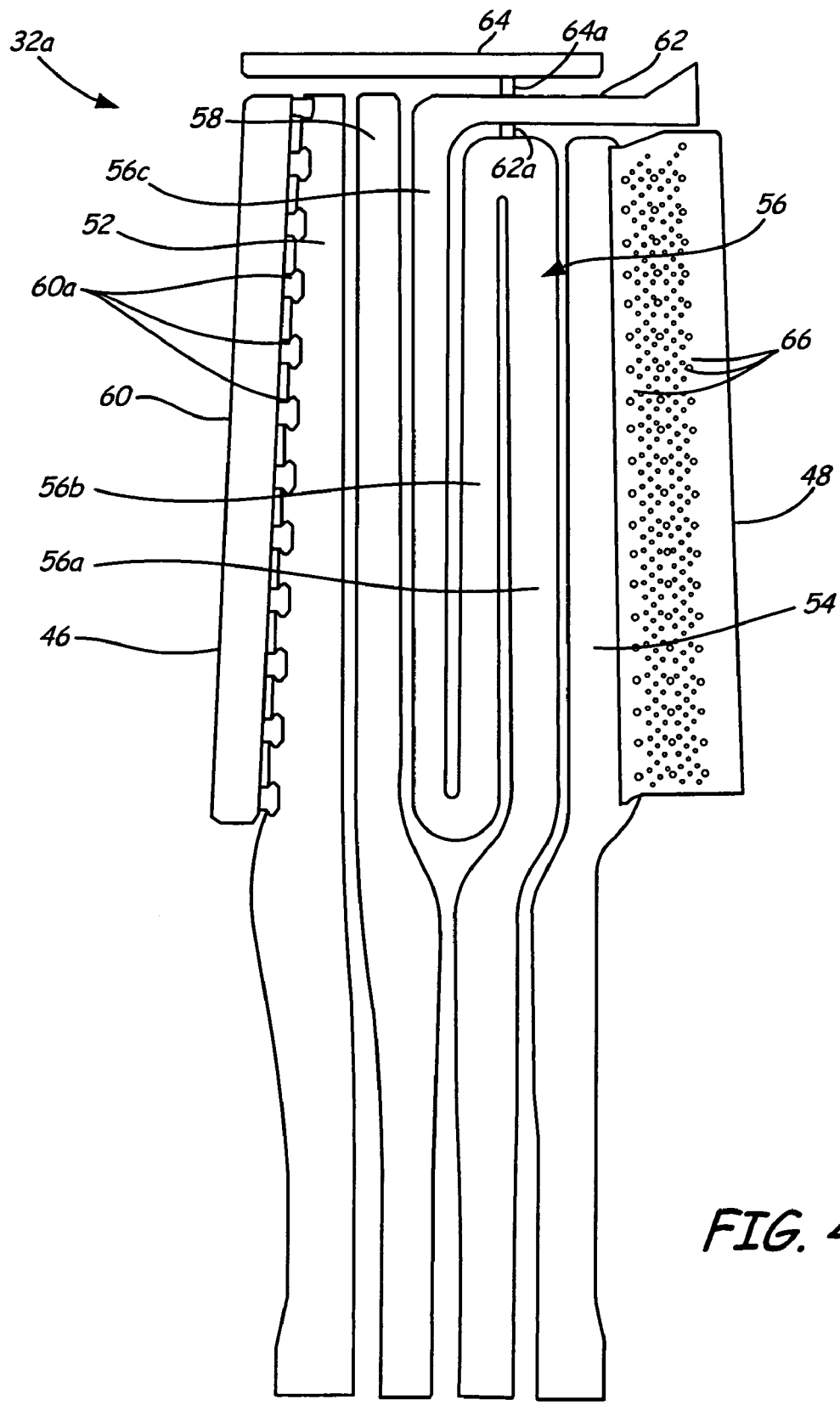
FIG. 4 is a plan view of an internal core of the cooled blade of FIG. 2.

FIG. 4 is a plan view of internal core 32a of blade 32 showing additional features of the cooling configuration of blade 32. In addition to previously discussed cooling channels 50, blade 32 includes leading edge cavity 60, axial channel 62, tip pocket 64, and trailing edge pedestals 66. Leading edge cavity 60 is forward of and in flow communication with leading edge channel 52 through cross-over apertures 60a. Leading edge cavity 60 may also include exhaust apertures adapted to exhaust cooling fluid from leading edge cavity 60 to the exterior of airfoil 40 along leading edge 46. Axial channel 62 is arranged adjacent the tip of airfoil 40 and is in flow communication with and extending afterward from third channel 56c of serpentine circuit 56 toward trailing edge 48. Axial channel 62 may terminate at a tip exhaust aperture in flow communication with axial channel 62 and the exterior of airfoil 40 adjacent trailing edge 48 toward the tip of blade 32. Core 32a may include core tie 62a connecting axial channel 62 to the junction between first and second channels 56a, 56b of serpentine circuit 56. Core tie 62a increases the stability of core 32a, especially at axial channel 62, during manufacturing processes, such as investment casting. Tip pocket 64 is a depression in the tip of airfoil 40 and may aid in cooling the tip of airfoil 40 by being supplied cooling air from one of the channels inside blade 32. As with axial channel 62, tip pocket 64 may be connected to core 32a at axial channel 62 by core tie 64a. Finally, trailing edge channel 54 may include pedestals 66 arranged in columns spaced axially from one another. Pedestals 66 extend across trailing edge channel 54 from concave pressure wall 42 to convex suction wall 44 of airfoil 40. Cooling fluid flows into trailing edge channel 54 and over pedestals 66 before being exhausted through trailing edge apertures, such as holes and/or slots. Pedestals 66 may act to increase convective cooling of blade 32 by adding surface area across which the cooling fluid flows in the region of trailing edge 48.

Figure 5A:
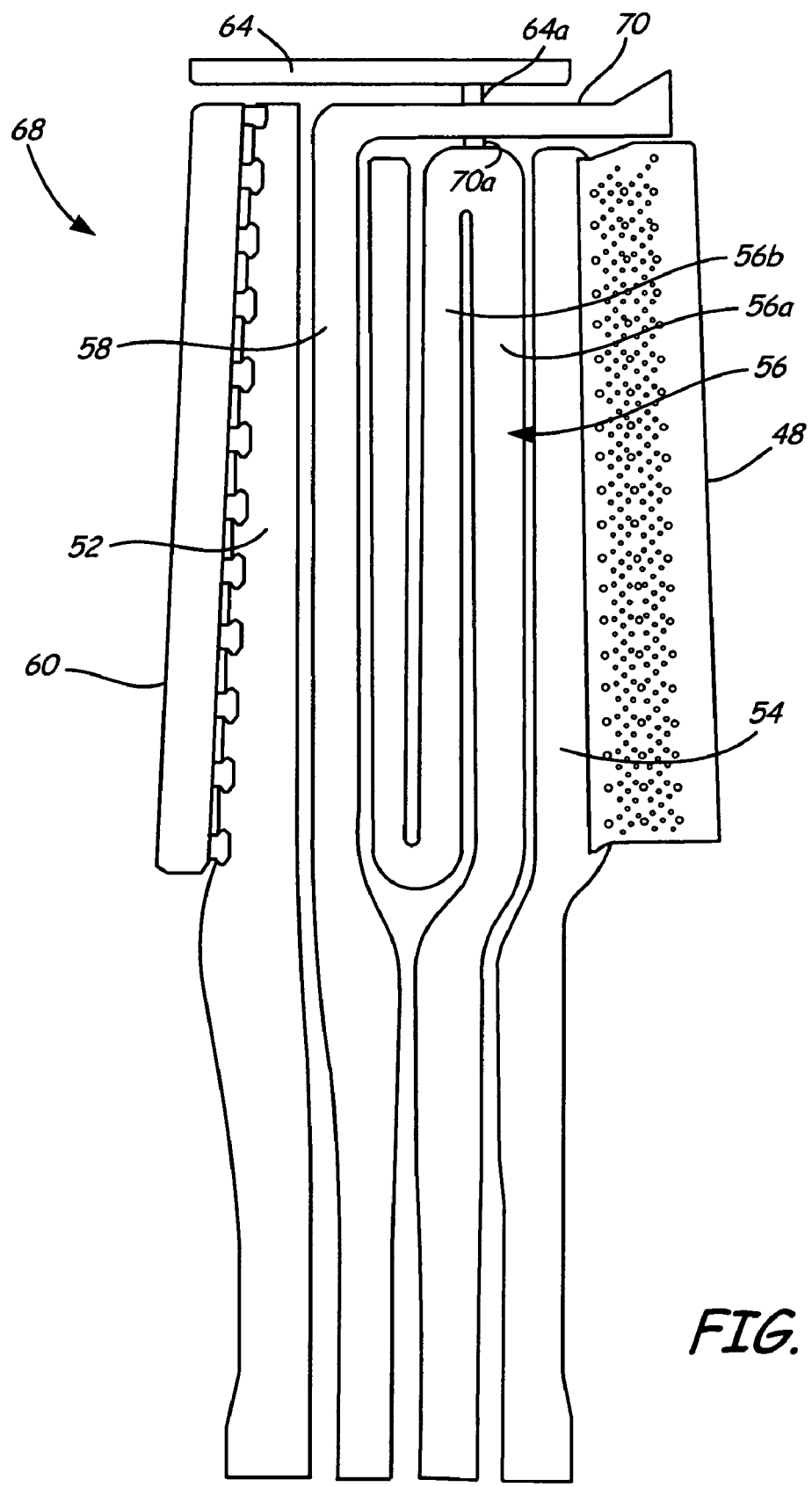
FIGS. 5A and 5B are plan views of the internal core of alternative embodiments of cooled blades according to the present invention.
Figure 5B:
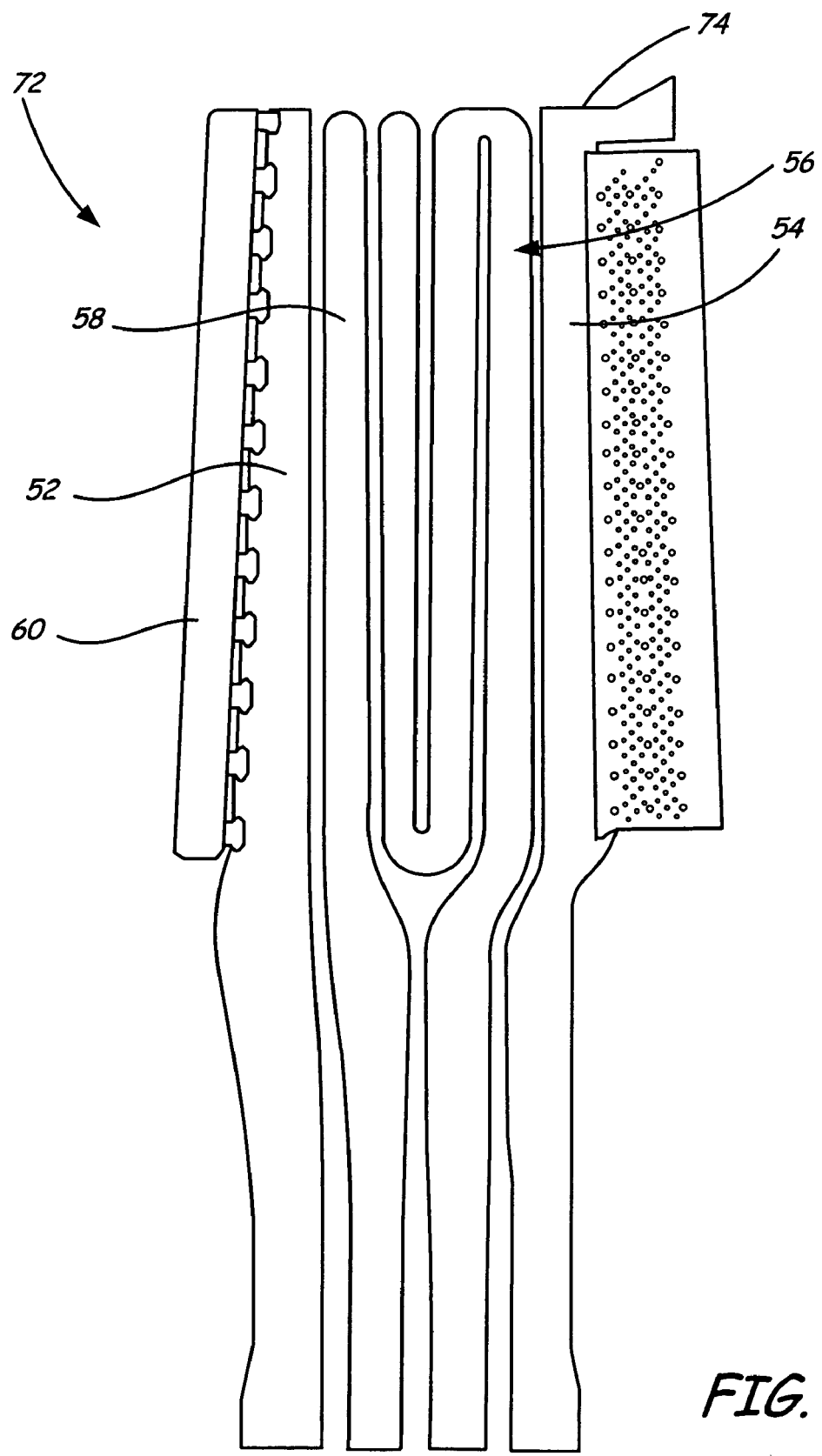

FIGS. 5A and 5B are plan views of the internal core of alternative embodiments of cooled blades according to the present invention. FIG. 5A shows internal core 68 including axial channel 70. In FIG. 5A, axial channel 70 is arranged adjacent the tip of airfoil 40 and is in flow communication with and extending afterward from dedicated up-pass channel 58 toward trailing edge 48. Axial channel 70 may terminate at a tip exhaust aperture in flow communication with axial channel 70 and the exterior of airfoil 40 adjacent trailing edge 48 toward the tip of blade 32. Core 68 may also include core tie 70a connecting axial channel 70 to the junction between first and second channels 56a, 56b of serpentine circuit 56. FIG. 5B shows internal core 72 including axial channel 74. In FIG. 5B, axial channel 74 is arranged adjacent the tip of airfoil 40 and is in flow communication with and extending afterward from trailing edge channel 54.

Cooled blades and vanes according to the present invention have several advantages over prior gas turbine engine blades and vanes. Embodiments of the present invention generally increase film cooling effectiveness and reduce blade temperatures along the relatively hot pressure side of the blade or vane airfoil. Gas turbine blades and vanes according to the present invention increase the number of up-pass channels by increasing the number of cooling fluid supply channels supplying cooling fluid to associated cooling channels. Additionally, embodiments of the present invention decrease the distance between up-pass channels by employing generally triangular shaped cooling channels in the serpentine cooling circuit. Decreasing the distance between up-pass channels and increasing the number of up-pass channels increases the cooling of the pressure wall by increasing the density of film cooling holes communicating cooling fluid from the up-pass channels to the pressure wall. Increasing the number of up-pass channels also increases the cooling effect on the pressure wall caused by rotation of the blade or vane.

Although the present invention has been described with reference to preferred embodiments, workers skilled in the art will recognize that changes may be made in form and detail without departing from the spirit and scope of the invention.

The invention claimed is:
1. A cooled airfoil comprising:
a concave pressure wall extending radially from a base to a tip of the airfoil;
a convex suction wall connected to the concave pressure wall at a leading edge and a trailing edge spaced axially from the leading edge; and
a plurality of cooling channels extending radially between the base and the tip of the airfoil between the concave pressure wall and the convex suction wall and config- ured to receive a cooling fluid supply through the base of the airfoil, the cooling channels comprising:
a leading edge channel;
a trailing edge channel;
a serpentine cooling circuit comprising:
  a first up-pass channel forward of the trailing edge channel and configured to be in flow communication with a supply channel through the base of the airfoil;
  a down-pass channel forward of and in flow communication with the first up-pass channel; and
  a second up-pass channel forward of and in flow communication with the down-pass channel;
  wherein at least the down-pass channel and the second up-pass channel comprise a generally triangular transverse cross-sectional shape;
a dedicated up-pass channel arranged between the leading edge channel and the second up-pass channel of the serpentine cooling circuit; and
an axial channel that is arranged adjacent the tip and in flow communication with and extending aftward from one of the second up-pass channel of the serpentine cooling circuit, the dedicated up-pass channel, or the trailing edge channel toward the trailing edge.

2. The airfoil of claim 1, wherein the distance along the concave pressure wall between the first up-pass channel and the second up-pass channel is minimized.

3. The airfoil of claim 1,
wherein the generally triangular down-pass channel is arranged such that a vertex is adjacent the concave pressure wall and a leg extends along a portion of the convex suction wall, and
wherein the generally triangular second up-pass channel is arranged such that a leg extends along a portion of the concave pressure wall and a vertex is adjacent the convex suction wall.

4. The airfoil of claim 1, wherein the supply channel is in flow communication exclusively with the first up-pass channel.

5. The airfoil of claim 1 further comprising a tip exhaust aperture in flow communication with the axial channel and the exterior of the airfoil adjacent the trailing edge toward the tip.

6. The airfoil of claim 1, wherein the trailing edge channel further comprises a plurality of pedestals arranged in a plurality of radial columns axially spaced from one another.

7. The airfoil of claim 1 further comprising one or more leading edge cavities forward of and in flow communication with the leading edge channel through a plurality of crossover apertures.

8. The airfoil of claim 7 further comprising a plurality of leading edge film cooling apertures adapted to exhaust cooling fluid from one or more of the leading edge cavities to the exterior of the airfoil.

9. The airfoil of claim 1, wherein the leading edge, trailing edge, and dedicated up-pass channels are configured to receive a cooling fluid from a second, third, and fourth supply channel through the base of the airfoil respectively.

10. The airfoil of claim 1 further comprising a plurality of film cooling apertures in flow communication with at least one channel in the serpentine cooling circuit and an exterior surface of the airfoil.

11. The airfoil of claim 1, wherein the trailing edge channel is in flow communication with a plurality of trailing edge apertures adapted to exhaust cooling fluid to an exterior of the airfoil.

12. A gas turbine blade comprising:
a root including a plurality of radially extending supply channels;
a concave pressure wall extending radially from the root to a tip of the blade;
a convex suction wall connected to the concave pressure wall at a leading edge and a trailing edge spaced axially from the leading edge;
a plurality of cooling channels extending radially between the base and the tip of the blade between the concave pressure wall and the convex suction wall and configured to receive cooling fluid from the supply channels in the root, the cooling channels comprising:
a leading edge channel;
a trailing edge channel;
a serpentine cooling circuit comprising:
  a first up-pass channel forward of the trailing edge channel and configured to be in flow communication with one of the supply channels in the root;
  a down-pass channel forward of and in flow communication with the first up-pass channel; and
  a second up-pass channel forward of and in flow communication with the down-pass channel;
  wherein at least the down-pass channel and the second up-pass channel comprise a generally triangular transverse cross-sectional shape;
a dedicated up-pass channel arranged between the leading edge channel and the second up-pass channel of the serpentine cooling circuit; and
an axial channel that is arranged adjacent the tip and in flow communication with and extending aftward from one of the second up-pass channel of the serpentine cooling circuit, the dedicated up-pass channel, or the trailing edge channel toward the trailing edge.

13. The blade of claim 12, wherein the distance along the concave pressure wall between the first up-pass channel and the second up-pass channel is minimized.

14. The blade of claim 12,
wherein the generally triangular down-pass channel is arranged such that a vertex is adjacent the concave pressure wall and a leg extends along a portion of the convex suction wall, and
wherein the generally triangular second up-pass channel is arranged such that a leg extends along a portion of the concave pressure wall and a vertex is adjacent the convex suction wall.

15. The blade of claim 12 further comprising a tip exhaust aperture in flow communication with the axial channel and the exterior of the blade adjacent the trailing edge toward the tip.

16. The blade of claim 12 further comprising one or more leading edge cavities forward of and in flow communication with the leading edge channel through a plurality of crossover apertures.

17. The blade of claim 16 further comprising a plurality of leading edge film cooling apertures adapted to exhaust cooling fluid from one or more of the leading edge cavities to the exterior of the blade.

18. The blade of claim 12, wherein the leading edge, trailing edge, and dedicated up-pass channels are each configured to receive cooling fluid from one of the supply channels in the root.

19. The blade of claim 12 further comprising a plurality of film cooling apertures in flow communication with at least one channel in the serpentine cooling circuit and an exterior surface of the blade.

20. A gas turbine engine comprising:
one or more rotors each of which rotors comprise a plurality of rotor blades circumferentially arranged about a rotation axis of the engine, wherein one or more of the rotor blades comprise:
- a root including a plurality of radially extending supply channels;
- a concave pressure wall extending radially from the root to a tip of the blade;
- a convex suction wall connected to the concave pressure wall at a leading edge and a trailing edge spaced axially from the leading edge;
- a plurality of cooling channels extending radially between the base and the tip of the blade between the concave pressure wall and the convex suction wall and configured to receive cooling fluid from the supply channels in the root, the cooling channels comprising:
  - a leading edge channel;
  - a trailing edge channel;
  - a serpentine cooling circuit comprising:
    - a first up-pass channel forward of the trailing edge channel and configured to be in flow communication with one of the supply channels in the root;
    - a down-pass channel forward of and in flow communication with the first up-pass channel; and
    - a second up-pass channel forward of and in flow communication with the down-pass channel;
    - wherein at least the down-pass channel and the second up-pass channel comprise a generally triangular transverse cross-sectional shape;
  - a dedicated up-pass channel arranged between the leading edge channel and the second up-pass channel of the serpentine cooling circuit; and
  - an axial channel that is arranged adjacent the tip and in flow communication with and extending aftward from one of the second up-pass channel of the serpentine cooling circuit, the dedicated up-pass channel, or the trailing edge channel toward the trailing edge.

21. The engine of claim 20, wherein the distance along the concave pressure wall between the first up-pass channel and the second up-pass channel is minimized.

22. The blade of claim 20,
wherein the generally triangular down-pass channel is arranged such that a vertex is adjacent the concave pressure wall and a leg extends along a portion of the convex suction wall, and
wherein the generally triangular second up-pass channel is arranged such that a leg extends along a portion of the concave pressure wall and a vertex is adjacent the convex suction wall.

23. The blade of claim 20, wherein at least one of the rotor blades further comprises a plurality of film cooling apertures in flow communication with at least one of the channels in the serpentine cooling circuit and an exterior of the blade.

* * * * *

UNITED STATES PATENT AND TRADEMARK OFFICE
CERTIFICATE OF CORRECTION

PATENT NO. : 8,177,507 B2  
APPLICATION NO. : 12/152370  
DATED : May 15, 2012  
INVENTOR(S) : Edward F. Pietraszkiewicz and Sandra S. Pinero It is certified that error appears in the above-identified patent and that said Letters Patent is hereby corrected as shown below:

Col. 1, Line 53
Delete "afterward"
Insert --aftward--

Col. 5, Line 61
Delete "afterward"
Insert --aftward--

Col. 6, Line 32
Delete "afterward"
Insert --aftward--

Signed and Sealed this
Fourteenth Day of August, 2012

David J. Kappos
*Director of the United States Patent and Trademark Office*